(12) United States Patent
Dunham (10) Patent No.: US 11,787,347 B1
(45) Date of Patent: Oct. 17, 2023

(54) UNIVERSAL, NO DRILL LADDER RACK

(71) Applicant: Howard Myron Dunham, Clear Lake, MN (US)

(72) Inventor: Howard Myron Dunham, Clear Lake, MN (US)

( * ) Notice: Subject to any disclaimer, the term of this patent is extended or adjusted under 35 U.S.C. 154(b) by 0 days.

(21) Appl. No.: 17/860,667

(22) Filed: Jul. 8, 2022

Related U.S. Application Data (60) Provisional application No. 63/203,181, filed on Jul. 12, 2021.

(51) Int. Cl.
*B60R 9/06* (2006.01)

(52) U.S. Cl.
CPC ...................... *B60R 9/06* (2013.01)

(58) Field of Classification Search
CPC ........................................ B60R 9/06
USPC ......................................... 224/405
See application file for complete search history.

(56) References Cited

U.S. PATENT DOCUMENTS

| | | | | |
|---|---|---|---|---|
| 3,891,262 A * | 6/1975 | Brunel | ........................ | B60P 7/06 296/3 |
| 4,138,046 A * | 2/1979 | De Freze | ................... | B60R 9/00 224/543 |
| 4,751,981 A * | 6/1988 | Mitchell | .................... | B60R 9/00 182/127 |
| 4,989,768 A * | 2/1991 | McNulty | ................. | B60P 3/002 224/571 |
| 5,108,141 A * | 4/1992 | Anderson | ................. | B60R 9/00 296/3 |
| 5,255,951 A * | 10/1993 | Moore, III | ................ | B60R 9/02 224/567 |
| 5,662,254 A * | 9/1997 | Lemajeur | .............. | B60R 9/0485 248/242 |
| 5,725,137 A * | 3/1998 | Macdonald | ............... | B60R 9/00 296/3 |
| 5,836,635 A * | 11/1998 | Dorman | .................... | B60P 3/40 296/3 |
| 6,517,134 B2 * | 2/2003 | Armstrong | ................ | B60R 9/06 296/26.05 |
| D494,532 S * | 8/2004 | Reese | .......................... | D12/406 |
| 7,104,429 B1 * | 9/2006 | Flores | ....................... | B60P 3/40 224/403 |
| 7,210,721 B1 * | 5/2007 | Bell | ...................... | B60R 9/0485 224/310 |
| 7,766,202 B2 * | 8/2010 | Depot | ....................... | B60R 9/06 224/519 |

(Continued)

OTHER PUBLICATIONS

"No drill truck rack," URL: https://www.amazon.com/no-drill-truck-rack/s?k=no+drill+truck+rack (Retrieved from the Internet on Jan. 6, 2023, 65 pages).

(Continued)

*Primary Examiner* — Peter N Helvey (74) *Attorney, Agent, or Firm* — Hamre, Schumann, Mueller & Larson, P.C.

(57) ABSTRACT

A ladder rack system (also referred to as a utility rack system) that is universal in that the ladder rack system can be used with different brands and models of pick-up trucks. The described ladder rack system is also "no drill" whereby the described ladder rack can be fixedly, yet removably, secured in the box of the pick-up truck without requiring any drilling of holes or requiring other significant permanent damage to the pick-up truck to mount the ladder rack system.

14 Claims, 8 Drawing Sheets

(56) References Cited

U.S. PATENT DOCUMENTS

| | | | | |
|---|---|---|---|---|
| 8,820,811 | B1* | 9/2014 | Hemphill | B60R 9/00 |
| | | | | 296/3 |
| 8,833,621 | B2* | 9/2014 | Burkhardt | B60P 3/40 |
| | | | | 224/403 |
| 9,487,152 | B2* | 11/2016 | Scott | B60R 9/045 |
| 9,718,391 | B1* | 8/2017 | Oxley | B62D 33/0207 |
| 10,160,397 | B1* | 12/2018 | Zlojutro | B60R 9/06 |
| 2008/0079277 | A1* | 4/2008 | Wethington | B60R 9/0485 |
| | | | | 296/3 |
| 2009/0255966 | A1* | 10/2009 | Prapavat | B60R 9/00 |
| | | | | 224/403 |
| 2017/0166105 | A1* | 6/2017 | Puchkoff | B60R 9/06 |
| 2018/0111562 | A1* | 4/2018 | Crandall | B62D 33/0222 |
| 2018/0154817 | A1* | 6/2018 | Chambers | B62D 33/023 |

OTHER PUBLICATIONS

"Apex NDALR Metallic Aluminum Ladder Rack," in existence as of Jul. 8, 2022, URL: https://www.amazon.com/Apex-NDALR-Metallic-Universal-Aluminum/dp/B01NCBCDVJ (7 pages).

\* cited by examiner

UNIVERSAL, NO DRILL LADDER RACK

FIELD

This technical disclosure relates to a system commonly referred to as a ladder rack (or a utility rack) that mounts in the box of a pick-up truck to allow the truck to carry objects above the box of the pick-up truck.

BACKGROUND

Some existing ladder rack systems are configured in a manner whereby they are intended to be permanently fixed to the box of the pick-up truck, for example using mechanical fasteners such as screws or bolts which require that holes be drilled in the box of the pick-up truck. This not only permanently damages the pick-up truck due to the drilling of the holes, but also makes removal of the ladder rack difficult. Other existing ladder rack systems are configured for use with a particular brand of pick-up truck so that if an owner of the ladder rack system switches to a different brand of truck or purchases a new model year truck where the box has been reconfigured, the ladder rack system may not be useable with the new pick-up truck.

SUMMARY

A ladder rack system (also referred to as a utility rack system) is described that is universal in that the ladder rack system can be used with different brands and models of pick-up trucks. The described ladder rack system is also "no drill" whereby the described ladder rack can be fixedly, yet removably, secured in the box of the pick-up truck without requiring any drilling of holes or requiring other significant permanent damage to the pick-up truck to mount the ladder rack system.

The ladder rack system has a number of components that are adjustable to permit the ladder rack system to be mounted in the boxes of a number of different brands and models of pick-up trucks. In addition, the ladder rack system can be fixed to the box of the pick-up truck using attachments that removably secure the ladder rack to the box of the pick-up truck, for example to one or more side walls of the box.

Advantages of the ladder rack system described herein include, among others: the ladder rack is secured to the truck box by connecting to the side lip at the top of the side wall of the truck box and to tie downs on the truck box; the ladder rack requires no drilling or screwing to the truck box; the ladder rack can be installed on pick-up trucks with roll up tonneau covers; the ladder rack can be installed in any size truck box; the ladder rack can be quickly installed, for example in less than 3-5 minutes; the ladder rack can be installed on either side of the box or on both sides of the box; the ladder rack can be quickly modified to permit the truck to pass through a car wash; the ladder rack requires no tools to install or remove; the ladder rack is very strong and can carry any objects such as ladders, canoes, kayaks, lumber etc.

DETAILED DESCRIPTION

Figure 1:
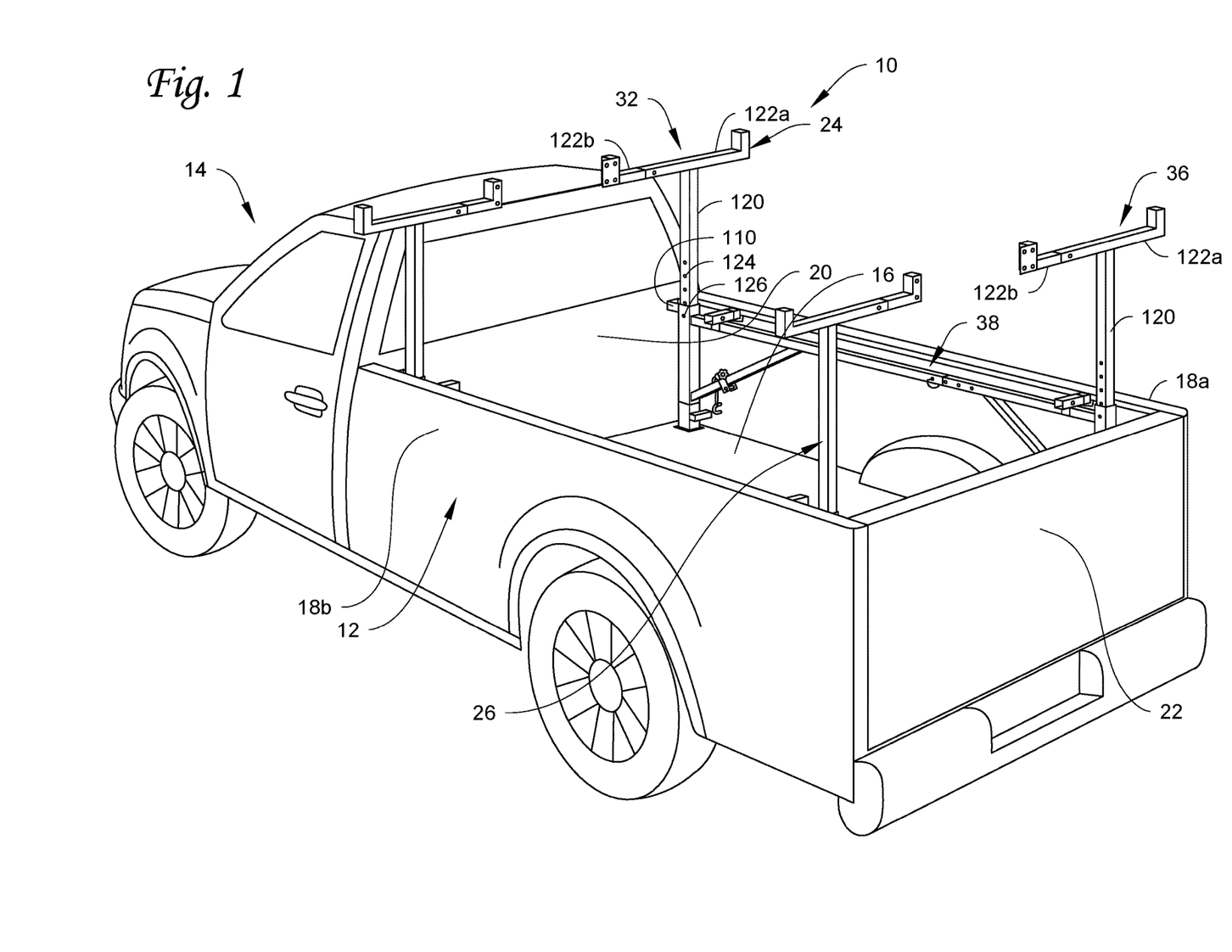
FIG. 1 is a perspective view of a pick-up truck with a ladder rack described herein installed.

Referring to FIG. 1, a ladder rack system 10 described herein is depicted as being mounted in a box 12 of a pick-up truck 14. The box 12 has a floor 16, first and second side walls 18*a*, 18*b*, a bulkhead 20, and a tailgate 22. The ladder rack system 10 includes a first ladder rack portion 24 (which may also be referred to as a right ladder rack portion) and a second ladder rack portion 26 (which may also be referred to as a left ladder rack portion). The first ladder rack portion 24 is mounted to the pick-up truck 14 generally at the right side of the box 12, while the second ladder rack portion 26 is mounted to the pick-up truck 14 generally at the left side of the box 12. In one embodiment, the ladder rack system 10 need not use both of the ladder rack portions 24, 26. Rather, a single one of the ladder rack portions 24, 26 may be used and mounted in the box 12 at any one time. The terms right and left used herein refers to the positions of the components relative to the truck 14 and relative to one another when viewing the truck 14 from the rear.

Except for differences resulting from respective use on the right side or the left side of the box 12, the first ladder rack portion 24 and the second ladder rack portion 26 are substantially identical in construction to one another. Accordingly, for sake of convenience, only the first ladder rack portion 24 will be described in detail, it being understood that the second ladder rack portion 26 (if used) has a nearly identical construction.

Figure 2:
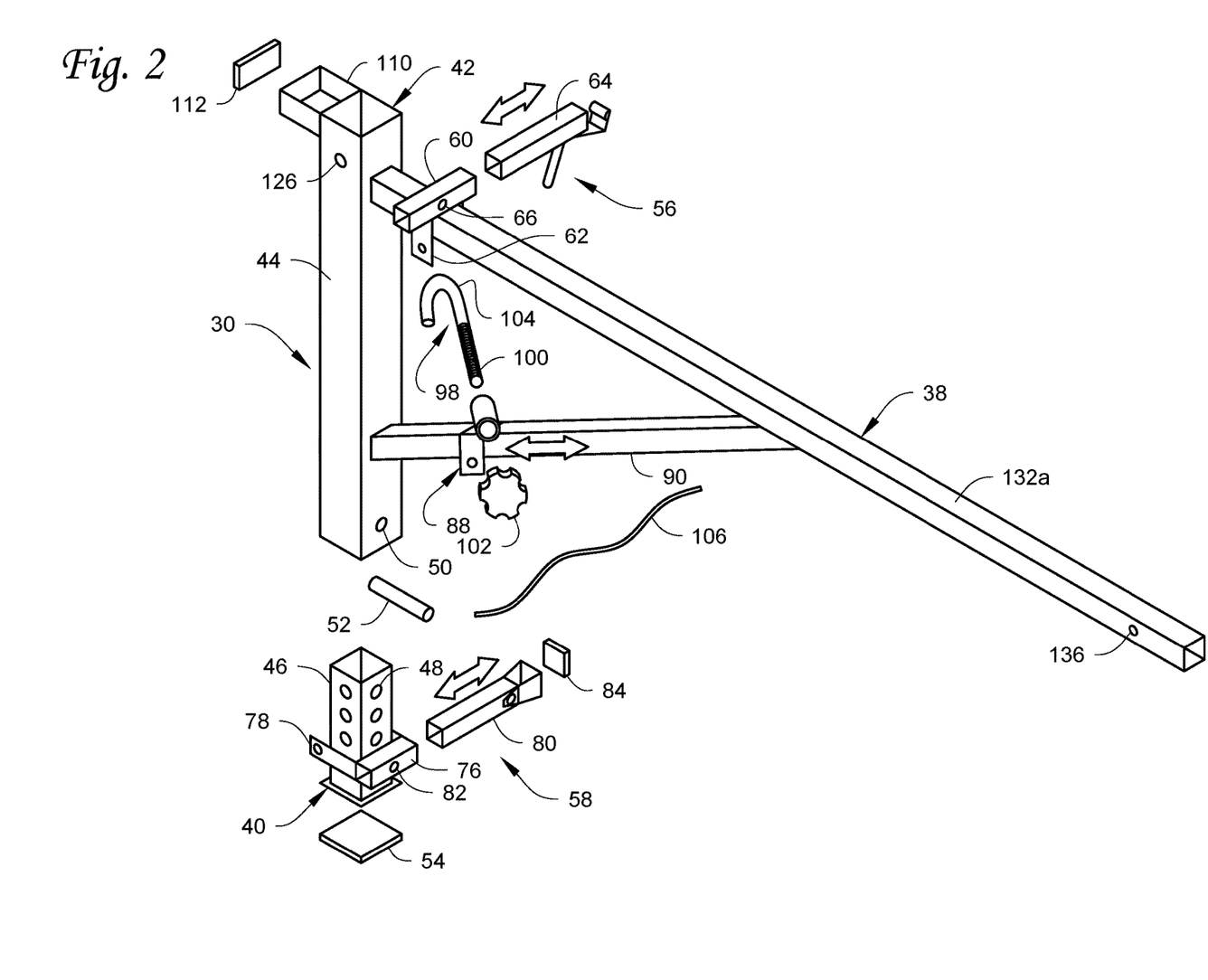
FIG. 2 is a perspective view of a front portion of a first ladder rack portion of the ladder rack depicted in FIG. 1.
Figure 3:
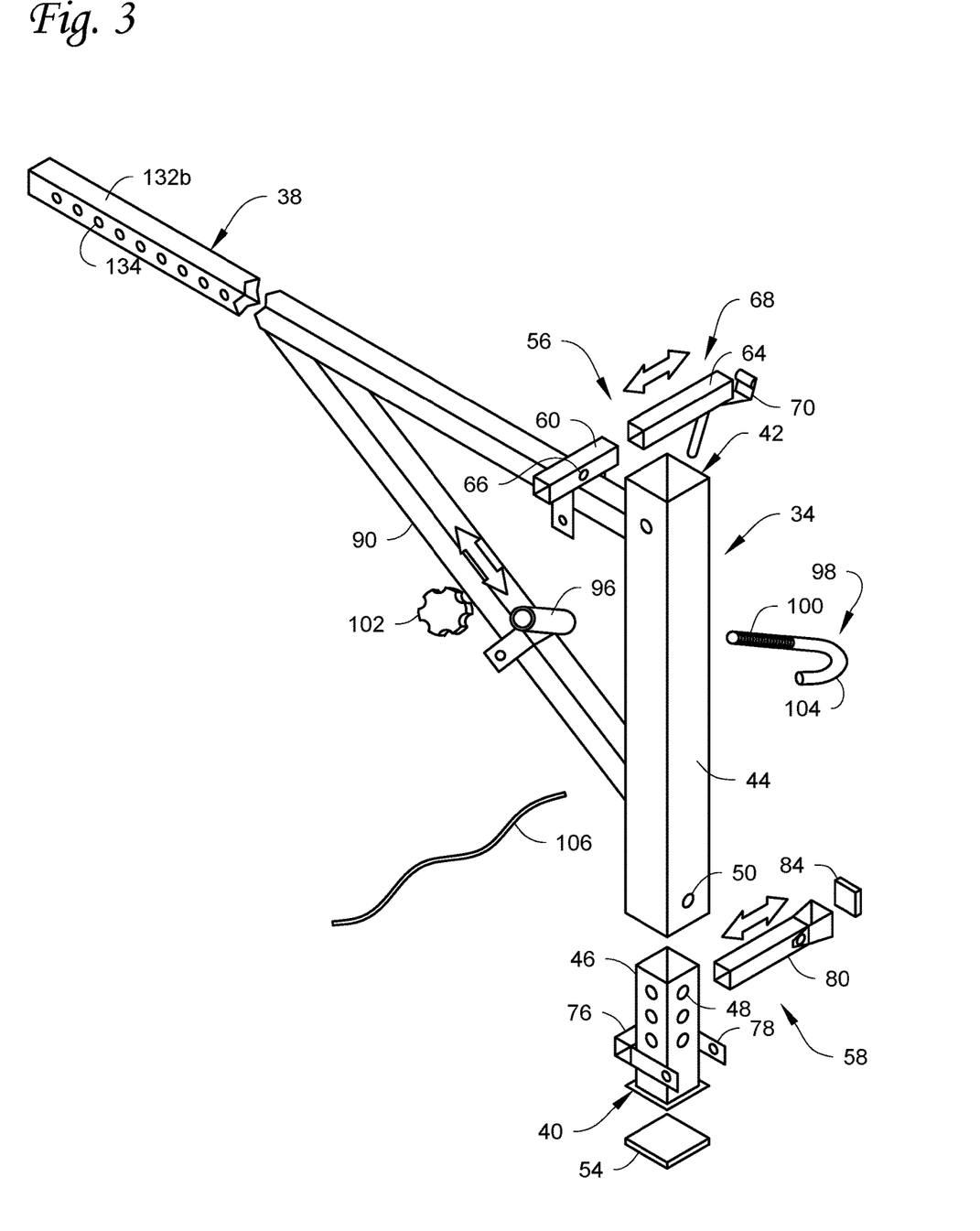
FIG. 3 is a perspective view of a rear portion of the first ladder rack portion of the ladder rack depicted in FIG. 1.

Referring to FIGS. 1-3, the first ladder rack portion 24 includes a first front vertical support 30, a first front object support 32, a first rear vertical support 34, a first rear object support 36, and a first horizontal spacer 38. As best seen in FIGS. 1 and 2, the first front vertical support 30 has a first end 40 configured to be engaged with the floor 16 and a second end 42 opposite the first end 40. For example, the first front vertical support 30 has a vertical support member 44 and a support foot member 46 at the base of the support member 44. The base of the support member 44 may be hollow, and a portion of the support foot member 46 can be telescopically received within the hollow base. The portion of the support foot member 46 telescoped within the hollow base can include a series of spaced adjustment holes 48, and the base of the support member 44 can include one or more adjustment holes 50. A removable adjustment pin 52, such as a bolt or the like, can be placed through aligned ones of the holes 48, 50 to lock the relative positions of the support member 44 and the support foot member 46. However, the pin 52 can be removed to permit adjustment of the vertical height of the vertical support 30 and the second end 42, in particular the height of the support member 44 by aligning the hole 50 with a new one of the holes 48. This permits the distance between the first end 40 and the second end 42 to be altered to accommodate the heights of the side walls of different brands and models of trucks. An optional support pad 54 can be provided between the base of the support foot member 46 and the floor of the pick-up truck to prevent scratching of the floor and to help distribute the load over a larger area of the floor. The support pad 54 may be integral with the base of the support foot member 46 or the support pad 54 may be separate from the support foot member 46. The support pad 54 maybe made of a metallic or non-metallic material.

With continued reference to FIGS. 1 and 2, a first upper, front spacer 56 and a first lower, front spacer 58 are provided. The spacers 56, 58 are configured to space the first ladder rack portion 24, in particular the front portion thereof, from the side wall 18a. In the illustrated example, the spacers 56, 58 are connected to and mounted on the first ladder rack portion 24, in particular mounted on the first front vertical support 30, and the spacer 58 is below the spacer 56. The spacer 56 includes a bracket 60 that is adjustably mounted on the horizontal spacer 38, for example by a clevis 62 and a bolt (not shown), to allow the longitudinal/horizontal position of the bracket 60 on the spacer 38 to be adjusted. A spacer element 64 can slidably fit within the bracket 60 to allow adjustment of the spacer element 64 in the direction of the arrows. A set screw 66 or other element can be provided on the bracket 60 and be engaged with the spacer element 64 to lock the desired position of the spacer element 64 as well as permit adjustment of position when loosened.

Figure 6:
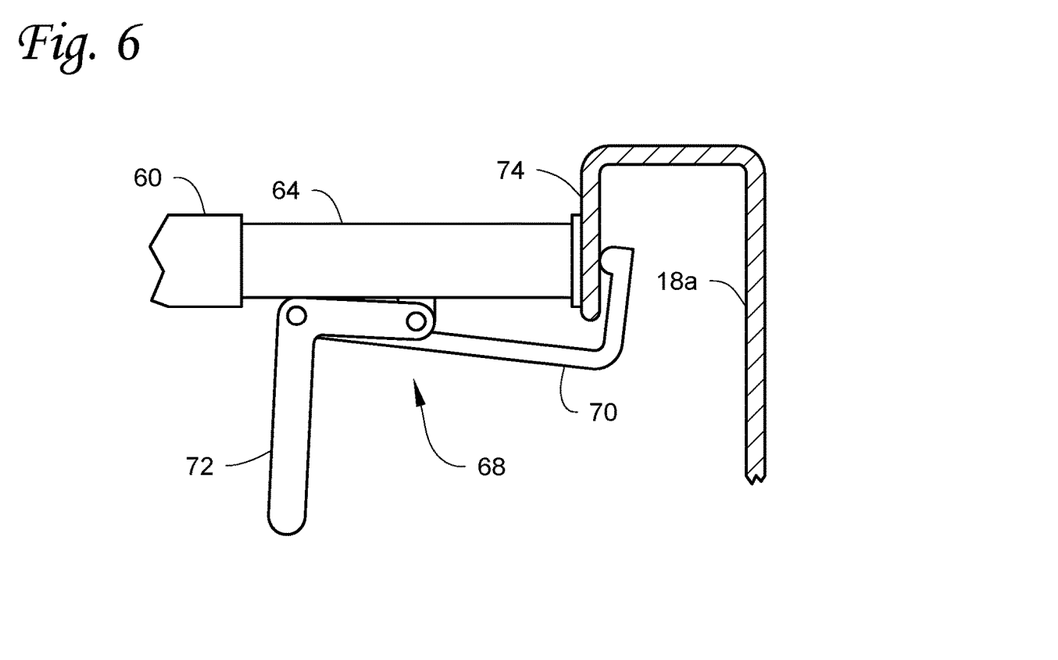
FIG. 6 depicts how an upper end of the first ladder rack portion is secured to the side wall of the truck box.

Referring to FIG. 6, a first upper, front attachment 68 is provided that is configured to releasably attach the front portion of the first ladder rack portion 24, in particular releasably attach the first front vertical support 30, to the side wall 18a. The attachment 68 can have any configuration that is suitable to releasably attach to the side wall 18a. For example, in the illustrated example, the attachment 68 is illustrated as being a toggle clamp mounted to the spacer element 64 that includes a pivoting clamp 70 and an actuating handle 72 attached to the clamp 70 that controls the clamp 70. The attachment 68 is configured to be releasably secured to a lip 74 of the side wall 18a.

Figure 4:
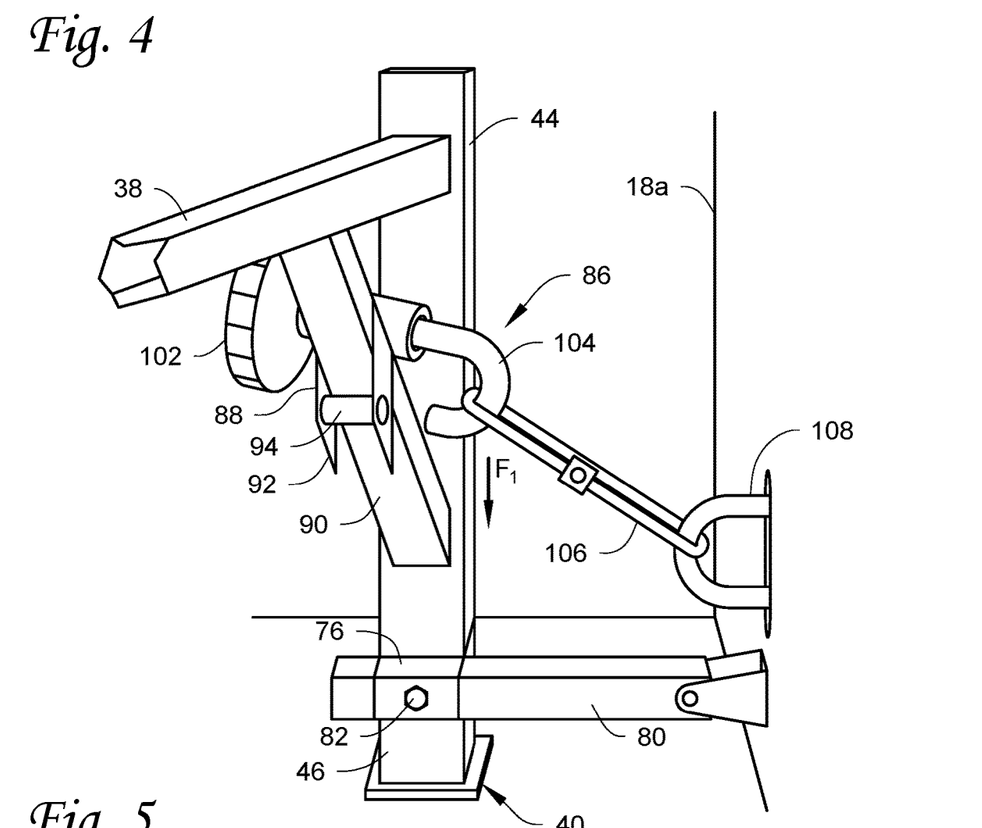
FIG. 4 is an end view of the front portion of the first ladder rack portion showing one of the lower attachments securing the lower portion of the first ladder rack portion to the side wall.

Referring to FIGS. 1, 2, and 4, the spacer 58 includes a bracket 76 that is adjustably mounted on the support foot member 46, for example by a clevis 78 and a bolt (not shown), to allow the vertical position of the bracket 76 on the support foot member 46 to be adjusted. A spacer element 80 can slidably fit within the bracket 76 to allow adjustment of the spacer element 80 in the direction of the arrows. A set screw 82 or other element can be provided on the bracket 76 and be engaged with the spacer element 80 to lock the desired position of the spacer element 80 as well as permit adjustment of position when loosened. An optional support pad 84 can be provided between the end of the spacer element 80 and the side wall 18a of the pick-up truck to prevent scratching of the side wall and to help distribute the load over a larger area of the side wall 18a. The support pad 84 may be integral with the end of the spacer element 80 or the support pad 84 may be separate from the spacer element 80. The support pad 84 may be made of a metallic or non-metallic material.

Figure 7A:
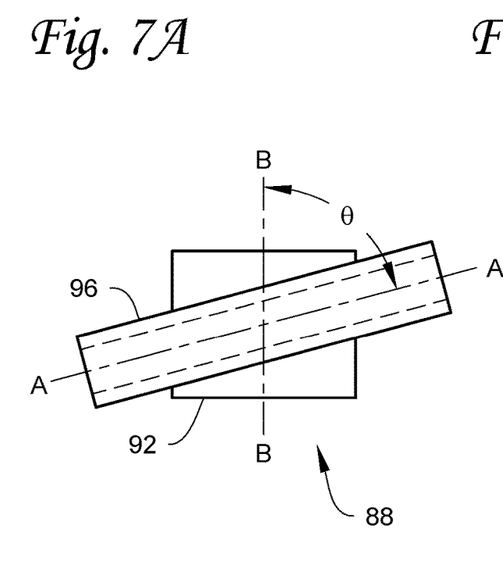
FIGS. 7A and 7B are detailed views of a lower adjustment mechanism for adjusting the position of the lower adjustment mechanism.
Figure 7B:
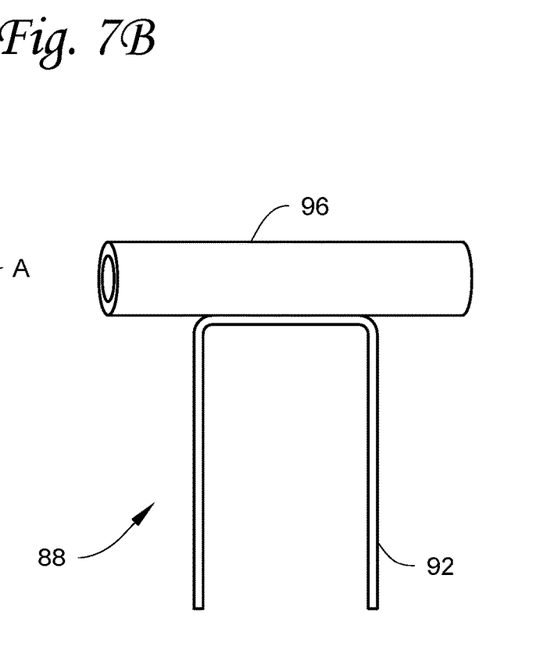

With continued reference to FIGS. 1, 2 and 4, a first lower, front attachment 86 is provided that is configured to releasably attach the front portion of the first ladder rack portion 24, in particular releasably attach the first front vertical support 30, to the side wall 18a. The attachment 86 is positioned generally below the upper attachment 68 which is not depicted in FIG. 4 for sake of clarity, and positioned generally vertically above the adjustable spacer 58. The attachment 86 can have any configuration that is suitable to releasably attach to the side wall 18a. For example, in the illustrated example, the attachment 86 is illustrated as including a bracket 88 that is adjustably mounted on a support member 90 that extends between the vertical support member 44 and the horizontal spacer 38. As best seen in FIGS. 7A and 7B, the bracket 88 can include a clevis 92 and a bolt 94, to allow the position of the bracket 88 on the support member 90 to be adjusted in the direction of the arrows in FIG. 2. A tube 96 is disposed on the clevis 92, with the axis A-A of the tube 96 disposed at an obtuse angle θ to the axis B-B of the clevis 92 and to the longitudinal axis of the support member 90 as best seen in FIGS. 2 and 7A. Returning to FIGS. 2 and 4, the attachment 86 further includes a J-hook 98 that extends through the tube 96. An end of the J-hook 98 is threaded 100 and is engaged by a hand-nut 102 that is threaded onto the threads 100. The hook-end 104 of the J-hook 98 is engaged with a looped structure 106 such as a chain, a cable, a tie-down strap or the like, with the other end of the looped structure 106 disposed around a tie-down 108 of the truck, for example disposed on the side wall 18a. By manually rotating the hand-nut 102 in one direction, the J-hook 98 is forced away from the side wall 18a which pulls on and tightens the looped structure 106. Rotating the hand-nut 102 in the other direction forces the J-hook 98 toward the side wall 18a and loosens the looped structure 106.

Figure 5:
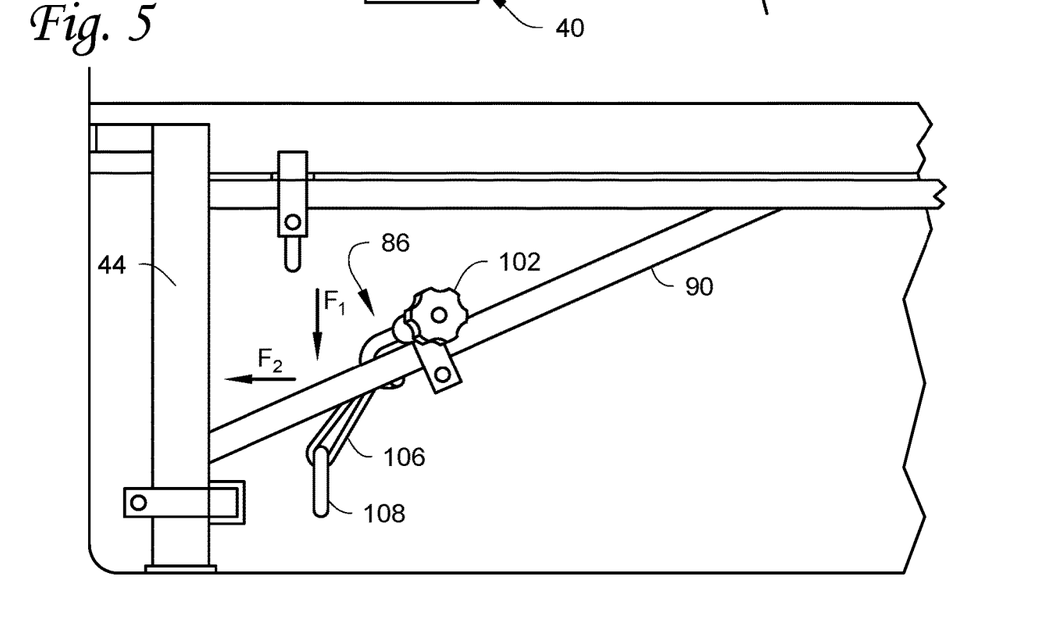
FIG. 5 is a side view of the front portion of the first ladder rack portion showing one of the lower attachments securing the lower portion of the first ladder rack portion to the side wall.

Referring to FIGS. 4 and 5, due to the relative positions of the attachment 86 and the tie-down 108, a hold down force is generated on the vertical support 30 of the first ladder rack portion 24 where the hold down force includes a vertical downward component $F_1$ and a forward or rearward component $F_2$ depending upon the relative horizontal locations of the attachment 86 and the tie-down 108. FIG. 5 shows the force component $F_2$ toward the front of the truck box because the attachment 86 is located to the rear of the tie-down 108. However, if the attachment 86 is repositioned so as to be located forward of the tie-down 108, the force component $F_2$ would be directed toward the rear of the truck box. Similarly, the force component $F_2$ of the attachment 86 of the rear vertical support 34 can be toward the front of the truck box or toward the rear of the truck box. When the front tie-down 108 is located to the rear of the front attachment 86 applying force toward the rear of the truck box, it is preferred that the rear attachment 86 be forward of the rear tie-down 108 to apply an opposing force. When the front tie-down 108 is located forward of the front attachment 86 applying force toward the front of the truck box (as depicted in FIG. 5), the rear attachment 86 can be located forward of the rear tie-down 108 or to the rear of the rear tie-down 108. When both of the attachments 86 are applying force toward the front of the truck box, a spacer 110 (described below) abuts against the bulkhead and prevents forward movement.

Referring to FIGS. 1 and 2, a bulkhead spacer 110 can be provided on the first front vertical support 30, for example on the support member 44 at or near the second end 42, that projects in a forward direction from the first front vertical support 30 to space the first front vertical support 30 from the bulkhead 20. An optional support pad 112 can be provided between the end of the spacer 110 and the bulkhead 20 of the pick-up truck to prevent scratching of the bulkhead 20 and to help distribute the load over a larger area of the bulkhead 20. The support pad 112 may be integral with the end of the spacer 110 or the support pad 112 may be separate from the spacer 110. The support pad 112 may be made of a metallic or non-metallic material.

Referring to FIGS. 1 and 3, the first rear vertical support 34 is substantially identical in construction to the first front vertical support 30 but is located at the rear of the box 12 adjacent to the tail gate 22. Elements of the vertical support 34 that are identical to corresponding elements in the vertical support 30 are referenced using the same reference numerals. The vertical support 34 includes the spacers 56, 58, the attachments 68, 86, and other features identical to features of the vertical support 30. Because the vertical support 34 is substantially identical to the vertical support 30, the vertical support 34 is not described in detail.

Referring to FIGS. 1-3, the first front object support 32 is mounted at the second or upper end 42 of the first front vertical support 30, and the first rear object support 36 is mounted at the second or upper end 42 of the first rear vertical support 34. The object supports 32, 36 are substantially identical in construction. Therefore, only the object support 32 is described in detail, it being understood that the object support 36 has a substantially identical construction. The object supports 32, 36 support objects such as ladders, canoes, kayaks, lumber etc.

Referring to FIGS. 1 and 2, the object support 32 includes a vertical portion 120 with a bottom portion thereof telescoped within the end 42 of the support member 44. A pair of lateral portions 122a, 122b extend laterally from an upper end of the vertical portion 120. The vertical portion 120 includes a plurality of adjustment holes 124 along at least a portion of the length thereof. The second end 42 of the support member 44 includes one or more adjustment holes 126. A removable adjustment pin (not shown), such as a bolt or the like, can be placed through aligned ones of the holes 124, 126 to lock the relative positions of the support member 44 and the vertical portion 120. However, the adjustment pin can be removed to permit adjustment of the vertical height, or removal, of the object support 32. The height adjustment of the object support 32 is separate and independent from the height adjustment of the vertical support 30.

The object support 32 may have a fixed width, or the object support 32 may be configured to have an adjustable width. For example, referring to FIG. 9, an example of the object support 32 with an adjustable width is depicted. In this example, the lateral portion 122a is configured as a tube and the lateral portion 122b is telescoped within the lateral portion 122a. The lateral portion 122b includes a series of adjustment holes 128 and the lateral portion 122a includes at least one adjustment hole 130. A removable adjustment pin (not shown), such as a bolt or the like, can be placed through aligned ones of the holes 128, 130 to lock the relative positions of the lateral portions 122a, 122b. However, the adjustment pin can be removed to permit the lateral portion 122b to be slid in or out relative to the lateral portion 122a to adjust the width of the object support 32.

Referring to FIGS. 1-3, the horizontal spacer 38 is attached to and extends between the first front vertical support 30 and the first rear vertical support 34. In particular, the spacer 38 is depicted as extending between the vertical support members 44. The spacer 38 is adjustable in length in order to adjust the distance between the front vertical support 30 and the rear vertical support 34. For example, the spacer 38 is depicted as include a first horizontal portion 132a extending rearwardly from the front vertical support member 44, and a second horizontal portion 132b extending forwardly from the rear vertical support member 44. The second horizontal portion 132b includes a plurality of adjustment holes 134 and is telescoped within the first horizontal portion 132a which includes one or more adjustment holes 136. A removable adjustment pin (not shown), such as a bolt or the like, can be placed through aligned ones of the holes 134, 136 to lock the relative positions of the horizontal portions 132a, 132b. However, the adjustment pin can be removed to permit the horizontal portion 132b to be slid in or out relative to the horizontal portion 132a to adjust the length of the horizontal spacer 38 and thereby adjust the distance between the front and rear vertical support members 44.

In an embodiment, one or more of the object supports 32, 36 of the first and second ladder rack portions 24, 26 may be configured to be connected to one another in order to form a continuous object support. For example, referring to FIG. 10A, the object supports 32, 36 (which could the front object support 32 and/or the rear object supports 36) of the ladder rack portions 24, 26 are depicted in what can be referred to as individual or single object supports. The horizontal portions 122b include upturned ends 140, and one of the upturned ends 140 includes a bracket 142. Matching holes 144 are provided in the upturned end 140, for example on the horizontal portion 122b of the second ladder rack portion 26, and in the bracket 142. Referring to FIG. 10B, the horizontal portions 122b can be extended toward one another until the bracket 142 overlaps the other upturned end 140 and the holes 144 are aligned. Fasteners (not shown) can then be used to removably attach the object supports to one another to form a single, continuous object support. The front object supports 32 can be connected together in this manner, the rear object supports 36 can be connected together in this manner, or both the front object supports 32 and the rear object supports 36 can be connected together in this manner.

Figure 8:
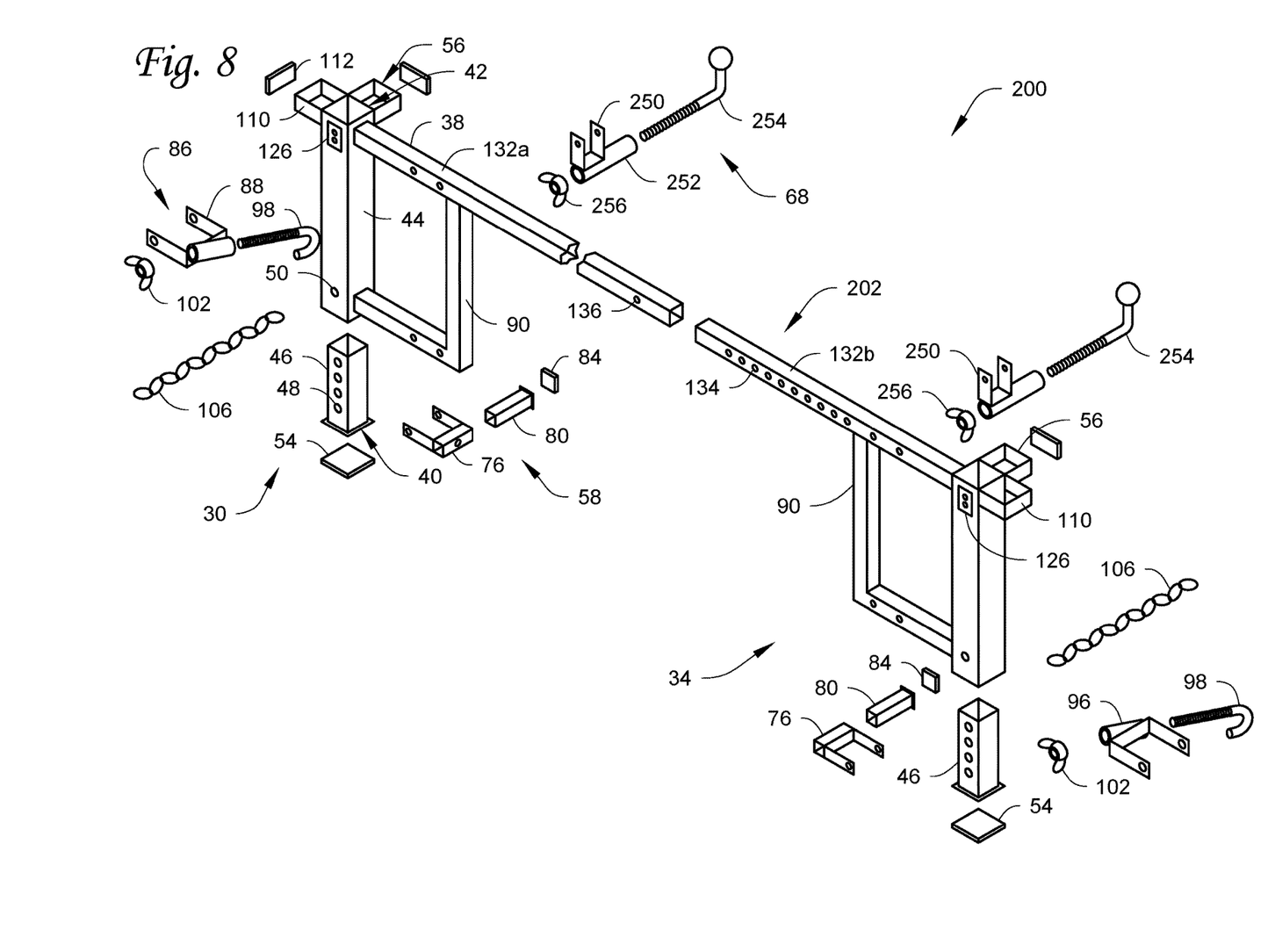
FIG. 8 is a perspective view of a portion of another embodiment of a ladder rack.

FIG. 8 illustrates another embodiment of a ladder rack system 200 that includes a first ladder rack portion 202 (which may also be referred to as a right ladder rack portion) and a second ladder rack portion which may also be referred to as a left ladder rack portion (not shown). The first ladder rack portion 202 is mounted to the pick-up truck generally at the right side of the box, while the second ladder rack portion is mounted to the pick-up truck generally at the left side of the box. The ladder rack portion 202 may be used by itself, the second ladder rack portion may be used by itself, or both of the ladder rack portions may be used together with and mounted in the truck box at any one time. The terms right and left used herein refers to the positions of the components relative to the truck and relative to one another when viewing the truck from the rear.

The ladder rack portion 202 is similar in construction to the ladder rack portion 24 and elements in the ladder rack portion 202 that are similar to elements in the ladder rack portion 24 are referenced using the same reference numerals. The first ladder rack portion 202 includes the first front vertical support 30, the first front object support (not shown), the first rear vertical support 34, the first rear object support (not shown), and the first horizontal spacer 38. The first front vertical support 30 has the first end 40 configured to be engaged with the floor of the truck and the second end 42 opposite the first end 40. The first front vertical support 30 has the vertical support member 44 and the support foot member 46 at the base of the support member 44. The base of the support member 44 may be hollow, and a portion of the support foot member 46 can be telescopically received within the hollow base. The portion of the support foot member 46 telescoped within the hollow base can include the series of spaced adjustment holes 48, and the base of the support member 44 can include the one or more adjustment holes 50. The removable adjustment pin (not shown) can be placed through aligned ones of the holes 48, 50 to lock the relative positions of the support member 44 and the support foot member 46. However, the pin can be removed to permit adjustment of the vertical height of the vertical support 30 and the second end 42, in particular the height of the support member 44 by aligning the hole 50 with a new one of the holes 48. This permits the distance between the first end 40 and the second end 42 to be altered to accommodate the heights of the side walls of different brands and models of trucks. The optional support pad 54 can be provided between the base of the support foot member 46 and the floor of the pick-up truck to prevent scratching of the floor and to help distribute the load over a larger area of the floor. The support pad 54 may be integral with the base of the support foot member 46 or the support pad 54 may be separate from the support foot member 46. The support pad 54 maybe made of a metallic or non-metallic material.

With continued reference to FIG. 8, the first upper, front spacer 56 and the first lower, front spacer 58 are provided. The spacers 56, 58 are configured to space the first ladder rack portion 24, in particular the front portion thereof, from the side wall 18a. In the illustrated example, the spacers 56, 58 are connected to and mounted on the first ladder rack portion 24, in particular mounted on the first front vertical support 30, and the spacer 58 is below the spacer 56. In this embodiment, the spacer 56 is not adjustable but rather includes a fixed bracket that extends from the support member 44 in a direction toward the side wall.

In FIG. 8, the first upper, front attachment 68 is separate from the spacer 56. In this example, the attachment 68 is illustrated as including a clamp 250 that clamps onto the horizontal spacer 38 via a clevis, with a tube 252 connected to the clamp 250. An L-shaped member 254 extends through the tube 252, with a threaded end of the member 254 engaged with a wing nut 256. The opposite end of the member 254 projects upwardly to fit behind the lip of the side wall depicted in FIG. 6. In this example, the attachment 68 is configured to be releasably secured to the lip of the side wall, with the wing nut 256 controlling the tension.

The spacer 58 is similar in construction to the spacer 58 in FIG. 2 including the bracket 76 that is adjustably mounted on the support foot member 46, for example by the clevis and a bolt (not shown), to allow the vertical position of the bracket 76 on the support foot member 46 to be adjusted. The spacer element 80 can slidably fit within the bracket 76 to allow adjustment of the spacer element 80. A set screw or other element can be provided on the bracket 76 and be engaged with the spacer element 80 to lock the desired position of the spacer element 80 as well as permit adjustment of position when loosened. The optional support pad 84 can be provided between the end of the spacer element 80 and the side wall of the pick-up truck to prevent scratching of the side wall and to help distribute the load over a larger area of the side wall. The support pad 84 may be integral with the end of the spacer element 80 or the support pad 84 may be separate from the spacer element 80. The support pad 84 may be made of a metallic or non-metallic material.

The first lower, front attachment 86 in FIG. 8 is similar in construction to, and functions in a similar manner as, the attachment 86 in FIGS. 2-4. The attachment 86 is positioned generally below the upper attachment 68, and positioned generally vertically above the adjustable spacer 58. The attachment 86 is shown as including the bracket 88 that is adjustably mounted on a support member 90 that extends between the vertical support member 44 and the horizontal spacer 38. The bracket 88 includes the clevis and a bolt to allow the position of the bracket 88 on the support member 90 to be adjusted. The tube 96 is disposed on the clevis, with the axis of the tube 96 disposed at the obtuse angle θ to the axis B-B of the clevis. The J-hook 98 extends through the tube 96, and the threaded end of the J-hook 98 is engaged by the hand-nut 102 that is threaded onto the threads. The hook-end of the J-hook 98 is engaged with the looped structure 106 such as a chain, a cable, a tie-down strap or the like, with the other end of the looped structure 106 disposed around the tie-down of the truck as explained above. By manually rotating the hand-nut 102 in one direction, the J-hook 98 is forced away from the side wall 18a which pulls on and tightens the looped structure 106. Rotating the hand-nut 102 in the other direction forces the J-hook 98 toward the side wall 18a and loosens the looped structure 106. Due to the relative positions of the attachment 86 and the tie-down, a hold down force is generated on the vertical support 30 of the first ladder rack portion where the hold down force includes a vertical downward component and a forward or rearward component depending upon the relative horizontal locations of the attachment 86 and the tie-down.

Figure 9:
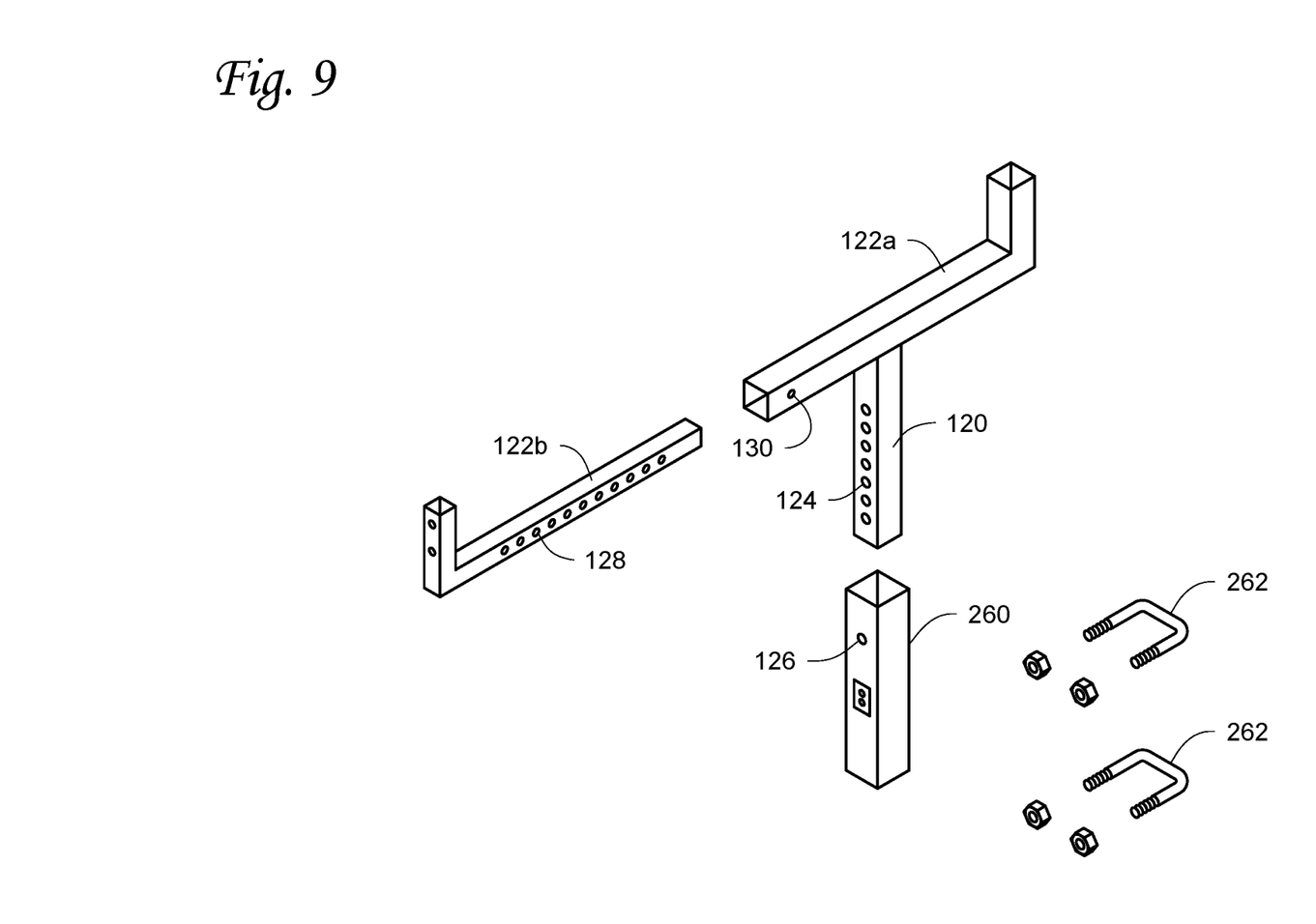
FIG. 9 is a perspective view of an object support that can be used with the ladder rack depicted in FIG. 1 or FIG. 7.
Figure 10A:
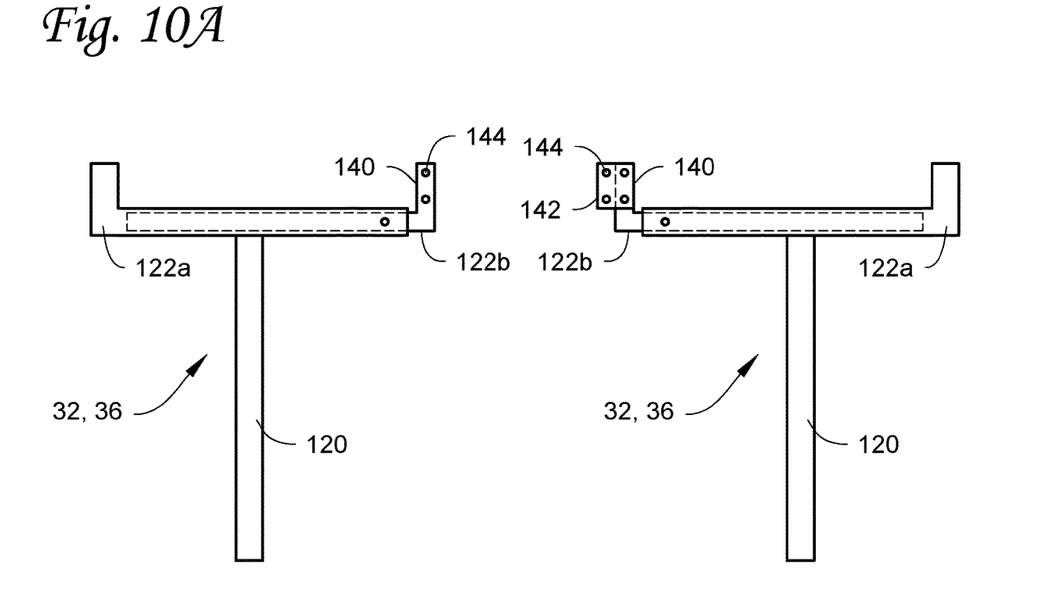
FIGS. 10A and 10B depict an optional interconnection between the object supports of the first and second ladder rack portions.
Figure 10B:
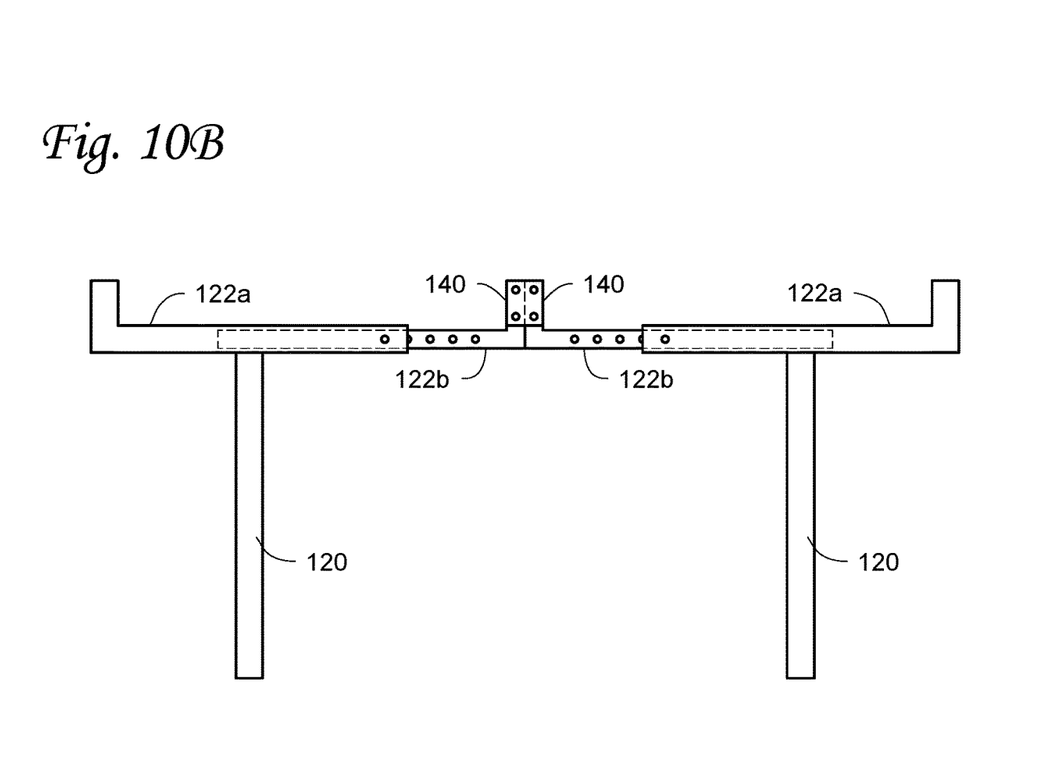

The object supports 32, 36 described in FIGS. 9, 10A and 10B can be used with the ladder rack system 200 in FIG. 8.

The horizontal spacer 38 is attached to and extends between the first front vertical support 30 and the first rear vertical support 34. In particular, the spacer 38 is depicted as extending between the vertical support members 44. The spacer 38 is adjustable in length in order to adjust the distance between the front vertical support 30 and the rear vertical support 34. For example, the spacer 38 is depicted as include the first horizontal portion 132a extending rearwardly from the front vertical support member 44, and a second horizontal portion 132b extending forwardly from the rear vertical support member 44. The second horizontal portion 132b includes the plurality of adjustment holes 134 and is telescoped within the first horizontal portion 132a which includes the one or more adjustment holes 136. A removable adjustment pin (not shown), such as a bolt or the like, can be placed through aligned ones of the holes 134, 136 to lock the relative positions of the horizontal portions 132a, 132b. However, the adjustment pin can be removed to permit the horizontal portion 132b to be slid in or out relative to the horizontal portion 132a to adjust the length of the horizontal spacer 38 and thereby adjust the distance between the front and rear vertical support members 44.

The following is an example of a specific construction and assembly sequence with respect to the system 200 illustrated in FIG. 8.

First Section of the Main Frame of the Truck Rack System 200

The first section 30 of the main frame consists of an upright length of square channel 44 measuring approx. 2"×2", a horizontal length 132a of square channel measuring approx. 1¾"×1¾" welded near the top of the 2×2" upright channel 44. A 1¾"×1¾" length of channel 90 is also welded to the bottom side of the horizontal 1¾"×1¾" channel 132a that drops down vertically and turns 90 degrees and is welded to the 2"×2" upright channel 44 near the bottom. There are two 2" spacers 56, 110 welded to the top sides of the 2"×2" upright channel 44; one 110 provides a 2" space at the front edge of the truck box and one 56 provides a 2" space from the side of the truck box.

Second Section of the Main Frame of the Truck Rack System 200

The second section 34 of the main frame consists of an upright length of square channel 44 measuring approx. 2"×2", a horizontal length 132b of square channel measuring approx. 1½"×1½" welded near the top of the 2"×2" upright channel 44. There is also a length of 1½"×1½" length of channel 90 welded to the bottom side of the 1½"×1½" horizontal 1½"×1½" channel that drops down vertically and turns 90 degrees and is welded to the 2"×2" upright channel 44 near the bottom. There are two 2" spacers 56, 110 welded to the top sides of the 2"×2" upright channel 44; one 110 provides a 2" space at the rear edge of the truck box and one 56 provides a 2" space from the side of the truck box when the entire assembly is turned 180 degrees, this allows the entire assembly to be used on either the driver or passenger side of the truck box. The horizontal length of 1½"×1½" square channel 132b slides into the horizontal length of 1¾"×1¾" square channel 132a allowing it to telescope in length to accommodate truck boxes from 5.5' to 8'.

Height Adjustment Legs of the Truck Rack System 200

The height adjustment legs of the truck rack system 200 consists of an upright length of square channel 46 measuring approx. 1¾", a square plate measuring approx. 2"×2" welded to the bottom. There are holes 48 drilled through it in a vertical line. The height adjustment legs are sized to telescope into the 2"×2" upright channels 44 of the main frame assemblies 30, 34.

Lower Adjustable Spacer Bracket 76

The lower adjustable spacer bracket 76 consists of a U-shaped band of metal with holes drilled in the ends, a square piece of channel measuring approx. 1"×1" welded to the bottom of the U-shaped band of metal. It is designed to slide over the exposed section of the height adjustment legs 46 with the open end of the channel pointing toward the sidewall of the pickup box. It is fastened to the height adjustment legs 46 with a bolt and nut through the drilled holes.

Lower Adjustable Spacer 80

The lower adjustable spacer 80 consists of a length of square channel measuring approx. ¾"×¾" with a metal plate welded to the end. It is designed to be inserted into the square channel on the lower adjustment spacer bracket 76 with the metal plate end pointing toward the side of the truck box.

J-Hook Tie Down Bracket 88

The J-hook tie down bracket 88 consists of a U-shaped band of metal with holes drilled in the ends, a length of metal tubing 96 welded to the bottom of the U-shape at a slight angle. It is slid on to the 2"×2" upright square channels 44 on the main frame assembly 30, 34 and fastened with a bolt and nut through the drilled holes.

Wing Nuts

The wing nuts 256 are used to adjust tension on the J-hook tie downs and adjustable box lip anchors.

Box Lip Anchor Brackets

The box lip anchor brackets 250 consist of a U-shaped band of metal with holes drilled in the ends and a length of metal tubing 252 welded parallel to the bottom of the U-shape. It is slid onto the horizontal length of square channel 132a, 132b on the main frame 30, 34 where it meets the upright length of 2"×2" square channel. It is fastened with a nut and bolt through the drilled holes.

J-Hook Tie Downs

The J-hook tie downs 98 are a J-shaped hook that is threaded on the opposite end of the hook. It is slid through the length of metal tubing 96 on the J-hook tie down bracket 88 with the hook end pointing to the sidewall of the pickup box.

Box Lip Anchors

The box lip anchor 254 is a threaded L-shaped bolt that is threaded on only one end. A metal plate is welded on to the unthreaded end. The threaded end is slipped through the metal tubing 252 on the box lip anchor bracket 250 with the metal plate end pointing toward the sidewall of the truck box.

Steel Chain

The steel chain 106 consists of a measured length of steel chain. One end of the chain is hooked on to the hook end of the J-hook tie downs 98, the other end is slipped through or around the truck box tie down and then also hooked on to the J-hook tie downs 98.

Load Support Sleeve Latch

The load support sleeve latch 126 consists of a metal latch that holds the load support sleeve 120 (FIG. 9) to the upright length of square channel 44 on the main frame assembly 30, 34.

Rubber Protector Pads

The rubber protector pads 54, 84, 112 are attached to all points of contact to the truck box.

Load Support

The load support 32, 36 (FIG. 9) consists of a length of square channel 120 with holes drilled in it and welded to another length of square channel 122a at a 90-degree angle that has another length of square channel welded to the end of it at a 90-degree angle.

Load Support Extension

The load support extension 122b (FIG. 9) consists of a length of square channel with another length of square channel welded to the end of it at a 90-degree angle. The square channel is sized to telescope into the open end of the square channel 122a on the load support. Holes 128 are drilled into the square channel to allow for adjustment.

Load Support Sleeve

The load support sleeve 260 consists of a length of square channel sized so the load support 120 can telescope into it for the height of load support adjustment. The load support sleeve 260 telescopes into the upright square channel 44 on the main frame 30, 34. It can also be mounted to the horizontal square channels on the main frame with U-bolts 262 to accommodate a roll-up tonneau cover.

U-Bolts

A bolt 262 shaped like a U with threads on both ends used to mount the load support sleeves 260 to the horizontal square channels 132a, 132b on the main frame to accommodate a roll-up tonneau cover.

The system 200 in FIG. 8 can be assembled as follows. On the inside of the truck box, measure the height from the bottom of the truck box to the top edge of the truck box. Adjust the height adjustment legs by sliding them into the bottom of the upright square channels on the main frame to achieve the desired height and secure them by installing the nut and bolt through the pre-drilled holes in the height adjustment legs and the pre-drilled holes in the upright square channels on the main frame.

Measure the length of the truck box. Slide the two main frames together by sliding the smaller horizontal square channel into the larger horizontal square channel to achieve the desired length and secure them together by using a nut and bolt in the pre-drilled holes.

Place the assembly inside the truck box against the sidewall of the truck box. Verify that the height and length of the assembly are set properly. Install box lip anchor brackets to the horizontal square channels located near each upright square channel with tubing on the bottom side of the horizontal channel. Fasten with a nut and bolt through the pre-drilled holes. Next, install the J-hook tie down brackets by sliding the J-hook tie down brackets onto the upright square channels on the main frame or onto the height adjustment legs (whichever will make the bracket height a few inches above the tie downs inside of the truck box) with the steel tubing on the inside of the upright channels of the main frame. Fasten the J-hook tie down brackets with a nut and bolt through the predrilled holes. Install the lower adjustment spacer bracket by sliding the lower adjustment spacer bracket onto the height adjustment legs or onto the upright square channels on the main frame (whichever will allow for the lowest vertically flat surface on the pickup box that is below the truck box tie down location) fasten bracket with a nut and bolt through the predrilled holes. Install the lower adjustable spacer through the square channel on the lower adjustment spacer bracket with the metal plate end pointed toward the sidewall of the truck box. Level the main frame vertically by adjusting the lower adjustable spacer in some; when the metal plate end contacts the sidewall of the truck box, the main frame assembly is level. Tighten the lower adjustable spacer with self-tapping screw through the hole in the square channel on lower adjustment spacer bracket. Install the J-hooks by sliding the J-hooks through the steel tubing on the J-hook tie down brackets with the hook end toward the truck box sidewall. Install wing nuts on the threaded end of the J-hook a few threads to hold the J-hook in place. Install the box lip anchors by sliding the box lip anchors through the metal tubing on the box lip anchor brackets with the metal plate end pointed toward the truck box sidewall. Thread wingnut on threaded end of box lip anchor a few threads.

To mount the main frame assembly to the truck box, turn the box lip anchors up and under the box lip and tighten with a wing nut. Hook one end of each chain onto each hook of the J-hook tie downs, pass the other end of the chains through the truck box tie downs in the truck box and pull the chain as tight as possible toward the hook end of the J-hook. Slide the closest link of chain onto the hook end of the J-hook. Tighten a wingnut onto the J-hook. The main frame is now installed. To install the load support sleeves, slide the load support sleeves onto the top of the upright square channels of the main frame (or mount them to the horizontal square channels on the main frame using the U-bolts provided to accommodate a roll-up tonneau cover) and lock into place using latch. To install the load supports, slide the load support into the load support sleeves with the top perpendicular to the main frame and adjustable width side facing inward. Adjust height so it clears the top of the truck cab. Fasten with a nut and bolt through the predrilled holes at the desired height. To install the load support extension, slide the load support extension into the load support and adjust the width to accommodate the desired load. Fasten with a nut and bolt through the predrilled holes.

To install the optional full utility rack system, install an additional truck rack system on the opposite side of the truck box. Adjust the load support to the same height and slide the load support extensions towards each other until they meet and fasten together with nuts and bolts through the predrilled holes.

The examples disclosed in this application are to be considered in all respects as illustrative and not limitative.

The scope of the invention is indicated by the appended claims rather than by the foregoing description; and all changes which come within the meaning and range of equivalency of the claims are intended to be embraced therein.

The invention claimed is:

1. A ladder rack system that is configured to mount in a box of a pick-up truck having a floor and first and second side walls, the ladder rack system comprising:
    a first ladder rack portion that includes a first front vertical support, a first front object support, a first rear vertical support, a first rear object support, and a first horizontal spacer;
    the first front vertical support has a first end configured to be engaged with the floor and a second end opposite the first end, wherein the first front vertical support is adjustable in height whereby a distance between the first end and the second end can be altered;
    the first front object support is mounted at the second end of the first front vertical support, the first front object support is adjustable in height relative to and separately from the first front vertical support;
    the first rear vertical support has a third end configured to be engaged with the floor and a fourth end opposite the third end, wherein the first rear vertical support is adjustable in height whereby a distance between the third end and the fourth end can be altered;
    the first rear object support is mounted at the fourth end of the first rear vertical support, the first rear object support is adjustable in height relative to and separately from the first rear vertical support;
    the first horizontal spacer is attached to and extends between the first front vertical support and the first rear vertical support, the first horizontal spacer is adjustable in length in order to adjust the distance between the first front vertical support and the first rear vertical support;
    a first upper, front spacer and a first lower, front spacer below the first upper, front spacer, the first upper, front spacer and the first lower, front spacer are connected to a front portion of the first ladder rack portion;
    a first upper, rear spacer and a first lower, rear spacer below the first upper, rear spacer, the first upper, rear spacer and the first lower, rear spacer are connected to a rear portion of the first ladder rack portion;
    at least two of the first upper, front spacer, the first lower, front spacer, the first upper, rear spacer and the first lower, rear spacer are adjustable in length in order to adjust a distance between the front portion and the rear portion of the first ladder rack portion and the first side wall;
    a first upper, front attachment and a first lower, front attachment below the first upper, front attachment that removably attach the front portion to the first side wall;
    a first upper, rear attachment and a first lower, rear attachment below the first upper, rear attachment that removably attach the rear portion to the first side wall.

2. The ladder rack system of claim 1, wherein the first upper, front attachment is mounted on the first upper, front spacer; and the first upper, rear attachment is mounted on the first upper, rear spacer.

3. The ladder rack system of claim 2, the first upper, front attachment is configured to attach to a lip of the first side wall; and the first upper, rear attachment is configured to attach to the lip of the first side wall.

4. The ladder rack system of claim 1, wherein the first lower, front attachment is positioned vertically above the first lower, front spacer; and the first lower, rear attachment is positioned vertically above the first lower, rear spacer.

5. The ladder rack system of claim 4, wherein the first lower, front attachment is configured to apply a force component toward the floor and a force component toward either the first rear vertical support or toward the first front vertical support; and the first lower, rear attachment is configured to apply a force component toward the floor and a force component toward either the first front vertical support or the first rear vertical support.

6. The ladder rack system of claim 1, further comprising:
a second ladder rack portion spaced from the first ladder rack portion, the second ladder rack portion includes:
a second front vertical support, a second front object support, a second rear vertical support, a second rear object support, and a second horizontal spacer;
the second front vertical support has a fifth end configured to be engaged with the floor and a sixth end opposite the fifth end, wherein the second front vertical support is adjustable in height whereby a distance between the fifth end and the sixth end can be altered;
the second front object support is mounted at the sixth end of the second front vertical support, the second front object support is adjustable in height relative to and separately from the second front vertical support;
the second rear vertical support has a seventh end configured to be engaged with the floor and an eighth end opposite the seventh end, wherein the second rear vertical support is adjustable in height whereby a distance between the seventh end and the eighth end can be altered;
the second rear object support is mounted at the eighth end of the second rear vertical support, the second rear object support is adjustable in height relative to and separately from the second rear vertical support;
the second horizontal spacer is attached to and extends between the second front vertical support and the second rear vertical support, the second horizontal spacer is adjustable in length in order to adjust the distance between the second front vertical support and the second rear vertical support;
a second upper, front spacer and a second lower, front spacer below the second upper, front spacer, the second upper, front spacer and the second lower, front spacer are connected to a front portion of the second ladder rack portion;
a second upper, rear spacer and a second lower, rear spacer below the second upper, rear spacer, the second upper, rear spacer and the second lower, rear spacer are connected to a rear portion of the second ladder rack portion;
at least two of the second upper, front spacer, the second lower, front spacer, the second upper, rear spacer and the second lower, rear spacer are adjustable in length in order to adjust a distance between the front portion and the rear portion of the second ladder rack portion and the second side wall;
a second upper, front attachment and a second lower, front attachment below the second upper, front attachment that removably attach the front portion of the second ladder rack portion to the second side wall;
a second upper, rear attachment and a second lower, rear attachment below the second upper, rear attachment that removably attach the rear portion of the second ladder rack portion to the second side wall.

7. The ladder rack system of claim 6, wherein the first rear object support and the second rear object support are removably attachable to one another.

8. The ladder rack system of claim 7, wherein the first front object support and the second front object support are removably attachable to one another.

9. The ladder rack system of claim 1, further comprising a bulkhead spacer on the first front vertical support that projects in a forward direction from the first front vertical support to space the first front vertical support from a bulkhead of the box of the pick-up truck.

10. The ladder rack system of claim 5, further comprising a first angled support interconnecting the first front vertical support and the first horizontal support, and a portion of the first lower, front attachment is adjustably mounted on the first angled support.

11. The ladder rack system of claim 10, further comprising a second angled support interconnecting the first rear vertical support and the first horizontal support, and a portion of the first lower, rear attachment is adjustably mounted on the second angled support.

12. A ladder rack system that is configured to mount in a box of a pick-up truck having a floor and first and second side walls, the ladder rack system comprising:
a first ladder rack portion that includes a first front vertical support, a first front object support, a first rear vertical support, a first rear object support, and a first horizontal spacer;
the first front vertical support has a first end configured to be engaged with the floor and a second end opposite the first end;
the first front object support is mounted at the second end of the first front vertical support;
the first rear vertical support has a third end configured to be engaged with the floor and a fourth end opposite the third end;
the first rear object support is mounted at the fourth end of the first rear vertical support;
the first horizontal spacer is attached to and extends between the first front vertical support and the first rear vertical support;
a first upper, front spacer and a first lower, front spacer below the first upper, front spacer, the first upper, front spacer and the first lower, front spacer are connected to a front portion of the first ladder rack portion;
a first upper, rear spacer and a first lower, rear spacer below the first upper, rear spacer, the first upper, rear spacer and the first lower, rear spacer are connected to a rear portion of the first ladder rack portion;
the first upper, front spacer, the first lower, front spacer, the first upper, rear spacer and the first lower, rear spacer space the front portion and the rear portion of the first ladder rack portion from the first side wall;
a first upper, front attachment and a first lower, front attachment below the first upper, front attachment;
a first upper, rear attachment and a first lower, rear attachment below the first upper, rear attachment;
the first upper, front attachment is configured to attach the front portion to a lip of the first side wall; and the first upper, rear attachment is configured to attach the rear portion to the lip of the first side wall; and
the first lower, front attachment is configured to apply a force component toward the floor and a force component toward either the first rear vertical support or toward the first front vertical support; and the first lower, rear attachment is configured to apply a force component toward the floor and a force component toward either the first front vertical support or toward the first rear vertical support.

13. The ladder rack system of claim 12, wherein the first upper, front attachment is mounted on the first upper, front spacer; and the first upper, rear attachment is mounted on the first upper, rear spacer.

14. The ladder rack system of claim 12, wherein the first lower, front attachment is positioned vertically above the first lower, front spacer; and the first lower, rear attachment is positioned vertically above the first lower, rear spacer.

* * * * *